United States Patent
Takeda et al.

(10) Patent No.: US 6,600,297 B2
(45) Date of Patent: Jul. 29, 2003

(54) POWER SUPPLY UNIT FOR REGULATING OUTPUT VOLTAGE USING A SERIES REGULATOR

(75) Inventors: Hitoshi Takeda, Shizuoka-ken (JP); Tomokazu Suzuki, Shizuoka-ken (JP); Masayasu Ito, Shizuoka-ken (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 10/109,358

(22) Filed: Mar. 28, 2002

(65) Prior Publication Data

US 2002/0140409 A1 Oct. 3, 2002

(30) Foreign Application Priority Data

Mar. 29, 2001 (JP) ........................................ 2001-096414

(51) Int. Cl.[7] .............................................. G05F 1/563
(52) U.S. Cl. ........................ 323/266; 323/270; 323/298
(58) Field of Search ................................. 323/266, 268, 323/269, 270, 298, 369

(56) References Cited

U.S. PATENT DOCUMENTS

| | | | | |
|---|---|---|---|---|
| 5,036,269 A | * | 7/1991 | Murari et al. | 323/266 |
| 5,216,351 A | * | 6/1993 | Shimoda | 323/268 |
| 5,783,908 A | | 7/1998 | Toda et al. | 315/82 |
| 6,459,246 B1 | * | 10/2002 | Roo | 323/270 |

* cited by examiner

Primary Examiner—Jeffrey Sterrett
(74) Attorney, Agent, or Firm—Rosenthal & Osha L.L.P.

(57) ABSTRACT

A power supply unit having a series regulator that changes an input DC voltage input from a DC power supply into a stabilized output DC voltage lower than the input DC voltage, includes: a power consuming unit, provided on a direct current path between the DC power supply and the series regulator, including a parallel circuit formed by a first fixed resistor and a semiconductor device; and a current setting unit operable to set the amount of a current flowing between a current input and a current output of the semiconductor device, wherein the current input of the semiconductor device is arranged on the DC power supply side thereof, the current output of the semiconductor device is arranged on the series regulator side thereof, and a setting input of the semiconductor device is connected to a setting output of the current setting unit.

20 Claims, 14 Drawing Sheets

POWER SUPPLY UNIT FOR REGULATING OUTPUT VOLTAGE USING A SERIES REGULATOR

This patent application claims priority from a Japanese patent application No. 2001-096414 filed on Mar. 29, 2001, the contents of which are incorporated herein by reference.

BACKGROUND OF THE INVENTION

1. Field of the Invention

The present invention relates to a power supply unit. More particularly, the present invention relates to a power supply unit with a series regulator (dropper type power supply).

2. Description of the Related Art

A series regulator (dropper type power supply) is known as a power supply unit that changes an input direct current (DC) voltage input from a DC power supply into a stabilized output DC voltage.

This series regulator changes the input DC voltage to the stabilized output DC voltage that is lower than the input DC voltage.

This series regulator, however, converts a power loss generated by voltage drop between an input and an output of a semiconductor device such as a transistor, used as a three-terminal regulator device serving as a main controlling device, into heat. Thus, in a case where the voltage drop is large, the power loss in the semiconductor device also becomes large, thereby reducing the reliability of the entire product.

SUMMARY OF THE INVENTION

Therefore, it is an object of the present invention to provide a power supply unit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a power supply unit having a series regulator that changes an input DC voltage input from a DC power supply into a stabilized output DC voltage lower than the input DC voltage, comprises: a power consuming unit, provided on a direct current path between the DC power supply and an input side of the series regulator, including a parallel circuit formed by a first fixed resistor and a semiconductor device having a current input, a current output and a setting input; and a current setting unit operable to set an amount of a current flowing between the current input and the current output of the semiconductor device, wherein the current input of semiconductor device is arranged on a DC-power-supply side thereof, the current output of the semiconductor device is arranged on a series-regulator side thereof, and the setting input of the semiconductor device is connected to a setting output of the current setting unit.

According to the second aspect of the present invention, a power supply unit having a series regulator that changes an input DC voltage input from a DC power supply into a stabilized output DC voltage lower than the input DC voltage, comprises: a first power consuming unit, provided in parallel to the series regulator, including a parallel circuit formed by a first fixed resistor and a first semiconductor device having a current input, a current output and a setting input; and a first current setting unit operable to set an amount of a current flowing between the current input and the current output of the first semiconductor device, wherein the current input of the first semiconductor device is arranged on a series-regulator-input side thereof, the current output of the first semiconductor device is arranged on a series-regulator-output side thereof, and the setting input of the first semiconductor device is connected to a setting output of the first current setting unit.

The power supply unit may further comprise: a second power consuming unit, provided on a direct current path between the DC power supply and the input of the series regulator, having a parallel circuit formed by a second fixed resistor and a second semiconductor device; and a second current setting unit operable to set an amount of a current flowing between a current input and a current output of the second semiconductor device, wherein the current input of the second semiconductor device is arranged on a DC-power-supply side thereof, the current output of the second semiconductor device is arranged on a series-regulator side thereof, and a setting input of the second semiconductor device is connected to a setting output of the second current setting unit.

In the power supply unit according to the first or second aspect of the present invention, the power consuming unit or the first or second power consuming unit may include the third fixed resistor connected to the semiconductor device in series in the parallel circuit.

In the power supply unit according to the first or second aspect of the present invention, the power consuming unit or the first or second power consuming unit may include the fourth fixed resistor connected to the parallel circuit in series.

In the power supply unit according to the first or second aspect of the present invention, the power consuming unit or the first or second power consuming unit may include a plurality of parallel circuits connected in series. Alternatively, the power consuming unit or the first or second power consuming unit may include a plurality of parallel circuits connected in parallel.

The current setting unit in the power supply unit of the first aspect of the present invention may set the amount of the current flowing through the semiconductor device by regulating a bias of the setting input of the semiconductor device. In this case, the current setting unit may include a changing unit operable to change the bias. Also, in this case, the current setting unit may regulate the bias by using a divided voltage generated by a plurality of resistor devices connected in series between the input DC voltage input from the DC power supply and a predetermined reference voltage.

Moreover, in this case, the current setting unit may use a voltage that regulates the output DC voltage of the series regulator as the predetermined reference voltage. Furthermore, the current setting unit may include a Zener diode that regulates the bias in this case.

The current setting unit may include a feedback circuit connected to the current output of the semiconductor device and an amplifying circuit having an input connected to the feedback circuit, another input to which the predetermined reference voltage is applied and an output connected to the setting input of the semiconductor device.

It is preferable that the current setting unit set the amount of the current flowing through the semiconductor device to make the amount of heat generated in the semiconductor device during an actual operation approximately equal to the amount of heat generated in the series regulator.

The first or second current setting unit in the power supply unit of the second aspect of the present invention may set the amount of the current flowing through the corresponding semiconductor device by regulating a bias of the setting input of the corresponding semiconductor device. In this case, the first or second current setting unit may include a changing unit operable to change the bias. Also, in this case, the first or second current setting unit may regulate the bias by using a divided voltage generated by a plurality of resistor devices connected in series between the input DC voltage input from the DC power supply and a predetermined reference voltage.

Moreover, in this case, the first or second current setting unit may use a voltage that regulates the output DC voltage of the series regulator as the predetermined reference voltage. Furthermore, the first or second current setting unit may include a Zener diode that regulates the bias in this case.

The first or second current setting unit may include a feedback circuit connected to the current output of the corresponding semiconductor device and an amplifying circuit having an input connected to the feedback circuit, another input to which the predetermined reference voltage is applied and an output connected to the setting input of the corresponding semiconductor device.

It is preferable that the first or second current setting unit set the amount of current flowing through the corresponding semiconductor device to make the amount of heat generated by the corresponding semiconductor device during an actual operation approximately equal to the amount of heat generated by the series regulator.

In the power supply unit according to the first aspect of the present invention, the series regulator may have a Zener diode that regulates the output DC voltage of the series regulator, the power consuming unit has the parallel circuit formed by the first fixed resistor and an npn transistor as the semiconductor device that are connected in parallel, a collector, an emitter and a base of the npn transistor serving as the current input, the current output and the setting input of the semiconductor device, respectively; the current setting unit may include a resistor series circuit formed by a plurality of resistor devices connected in series, one end of the resistor series circuit being connected to the DC power supply, the other end being connected to a cathode terminal of the Zener diode; and a divided voltage generated at the setting output of the current setting unit, that is positioned between the plurality of resistor devices, may be applied to the base of the npn transistor.

In this case, the current setting unit may include the third fixed resistor in the parallel circuit so as to be provided between the collector of the npn transistor and the input end of the series regulator.

Moreover, in this case, the power supply unit according to the first aspect of the present invention may include the fourth fixed resistor in the parallel circuit to be provided between the emitter-end of the parallel circuit and the input end of the series regulator. In addition, the fourth fixed resistor may be provided between the collector-end of the parallel circuit and the DC power supply.

In the power supply unit according to the first aspect of the present invention, the series regulator may have a Zener diode that regulates the output DC voltage of the series regulator; the power consuming unit may have the parallel circuit formed by the first fixed resistor and a pnp transistor as the semiconductor device that are connected in parallel, an emitter, a collector and a base of the pnp transistor serving as the current input, the current output and the setting input of the semiconductor device, respectively; and the current setting unit may include a resistor series circuit formed by a plurality of resistor devices connected in series and an npn transistor, one end of the resistor series circuit being connected to the DC power supply, the other end being connected to a cathode terminal of the Zener diode. In the npn transistor, a divided voltage generated at the setting output of the current setting unit, that is positioned between the plurality of resistor devices, is applied to the base; an emitter is connected to the series regulator; and a collector is connected to the DC power supply via the first one of the plurality of resistor devices and to the base of the pnp transistor via the second one of the plurality of resistor devices.

In this case, the fourth fixed resistor may be provided in the parallel circuit between the collector-end of the parallel circuit and the input end of the series regulator.

In the power supply unit according to the first aspect of the present invention, the series regulator may include the first Zener diode operable to regulate the output DC voltage of the series regulator and the first Zener resistor connected between a cathode terminal of the first Zener diode and the input of the series regulator; the power consuming unit includes the parallel circuit formed by an npn transistor as the semiconductor device and the first fixed resistor that are connected in parallel, a collector, an emitter and a base of the npn transistor respectively serving as the current input, the current output and the setting input of the semiconductor device; the current setting unit may include the second Zener diode and the second Zener resistor connected between a cathode terminal of the second Zener diode and the DC power supply; and the setting output of the current setting unit may be the cathode terminal of the second Zener diode, a Zener voltage generated at the cathode terminal of the second Zener diode being applied to the base of the npn transistor in the parallel circuit.

In the power supply unit according to the first aspect of the present invention, the series regulator may include a Zener diode operable to regulate the output DC voltage of the series regulator; the power consuming unit may include a plurality of parallel circuits connected in series each of which is formed by an npn transistor as the semiconductor device and the first fixed resistor connected in parallel, a collector, an emitter and a base of the npn transistor respectively serving as the current input, the current output and the setting input of the semiconductor device; the current setting unit may include a resistor series circuit formed by a plurality of resistor devices connected in series, one end of the resistor series circuit being connected to the DC power supply while the other end is connected to a cathode terminal of the Zener diode, the number of the resistor devices corresponding to the number of the parallel circuits in the power consuming circuit; the setting output of the current setting unit may be respective connection points between the plurality of resistor devices; and divided voltages, different from each other, generated at the respective connection points may be applied to the bases of the npn transistors in the respective parallel circuits in accordance with an order in which the npn transistors are arranged.

Moreover, in the power supply unit according to the first aspect of the present invention, the series regulator may include a Zener diode operable to regulate the output DC voltage of the series regulator; the power consuming unit may include a plurality of parallel circuits connected in series each of which is formed by an npn transistor as the semiconductor device and the first fixed resistor connected in parallel, a collector, an emitter and a base of the npn transistor respectively serving as the current input, the current output and the setting input of the semiconductor device; the current setting unit may include a resistor series circuit formed by a plurality of resistor devices connected in series, one end of the resistor series circuit being connected to the DC power supply while the other end is connected to a cathode terminal of the Zener diode, the number of the resistor devices being equal to the number of the parallel circuits in the power consuming circuit; the setting output of the current setting unit may be respective connection points between the plurality of resistor devices; and divided voltages generated at the respective connection points may be applied to the bases of the npn transistors in the respective parallel circuits.

In the power supply unit according to the first aspect of the present invention, the power consuming unit may include the parallel circuit formed by an npn transistor as the semiconductor device and the first fixed resistor connected in parallel, a collector, an emitter and a base of the npn transistor respectively serving as the current input, the current output and the setting input of the semiconductor device; the current setting unit may include a feedback circuit connected to the emitter of the npn transistor and an inverting amplifying circuit having an inverting input connected to the feedback circuit and a non-inverting input to which the predetermined reference voltage for regulating the output DC voltage of the series regulator is applied; and the setting output of the current setting unit may be an output of the inverting amplifying circuit that is connected to the base of the npn transistor.

In the power supply unit according to the first aspect of the present invention, the power consuming unit may include the parallel circuit formed by a pnp transistor as the semiconductor device and the first fixed resistor connected in parallel, an emitter, a collector and a base of the pnp transistor respectively serving as the current input, the current output and the setting input of the semiconductor device; the current setting unit may include a feedback circuit connected to the collector of the pnp transistor, an inverting amplifying circuit where an inverting input is connected to the feedback circuit, to a non-inverting input is applied the predetermined reference voltage for regulating the output DC voltage of the series regulator, and an output is connected to the base of the pnp transistor, and an npn transistor having a base connected to the output of the inverting amplifying circuit and an emitter connected to the predetermined reference voltage; and the setting output of the current setting unit may be a collector of the npn transistor, that is connected to the base of the pnp transistor.

According to the third aspect of the present invention, a power supply unit having a series regulator that changes an input DC voltage input from a DC power supply into a stabilized output DC voltage lower than the input DC voltage, comprises: the fifth fixed resistor connected to the series regulator in parallel; and a clamp diode operable to clamp an output voltage to be a predetermined voltage between the input DC voltage and the output DC voltage.

The clamp diode may be a Zener diode having a cathode terminal connected to the output of the series regulator and an anode terminal connected to a reference voltage of the series regulator.

In the power supply unit according to the third aspect of the present invention, the series regulator may include a Zener diode operable to regulate the output DC voltage of the series regulator and a Zener resistor connected between a cathode terminal of the Zener diode and the input of the series regulator; and the clamp diode may be formed by a diode having an anode terminal connected to the output of the series regulator and a cathode terminal connected to the cathode terminal of the Zener diode, and another Zener diode.

In the power supply unit according to the third aspect of the present invention, the series regulator may include a Zener diode operable to regulate the output DC voltage of the series regulator; the power supply unit may further comprise a power consuming unit including a parallel circuit formed by an npn transistor and the first fixed resistor connected in parallel, and a current setting unit including a resistor series circuit formed by a plurality of resistor devices connected in series, one end of the resistor series circuit being connected to the DC power supply while the other end is connected to a cathode terminal of the Zener diode, a divided voltage generated at a setting output of the current setting unit, that is located between the plurality of resistor devices, being applied to a base of the npn transistor so as to regulate the amount of a current flowing between a collector and an emitter of the npn transistor which respectively serve as a current input and a current output thereof; and the clamp diode may be formed by a diode having an anode terminal connected to the output of the series regulator and a cathode terminal connected to the cathode terminal of the Zener diode, and another Zener diode.

In any of the power supply units according to the first, second and third aspects of the present invention, it is desirable that the respective fixed resistor be formed by printing on a printed board, for example, of aluminum or ceramic.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
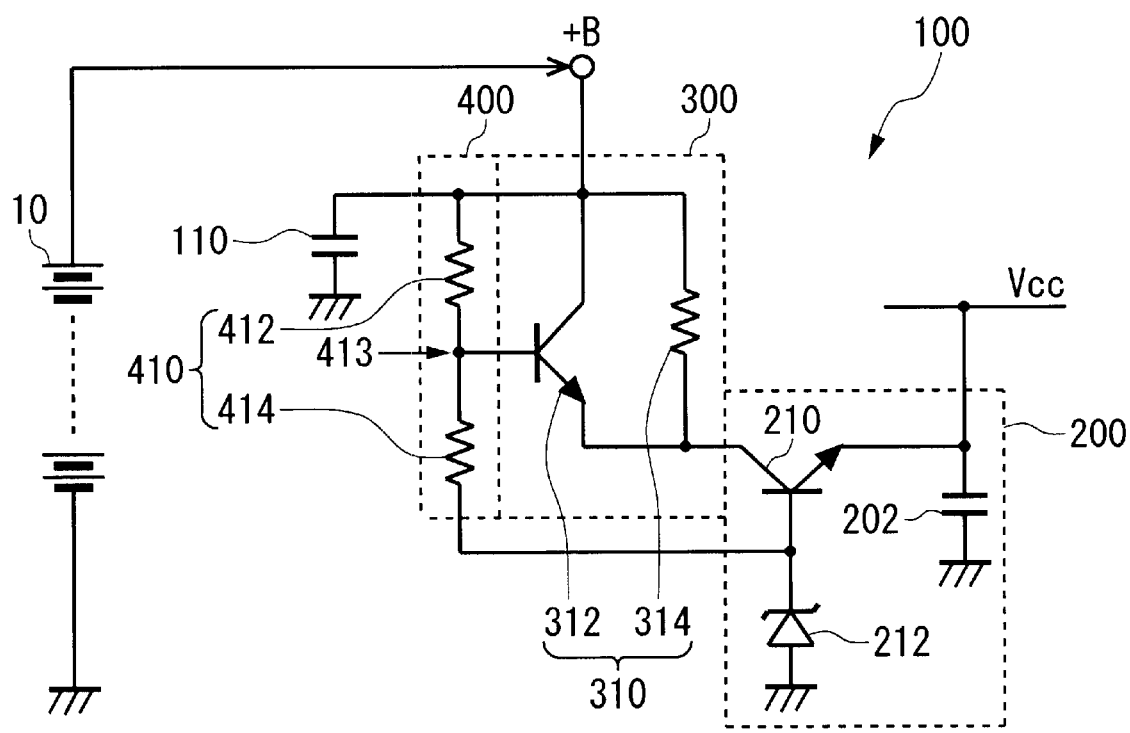
FIG. 1 is a circuit diagram of a power supply unit according to the first embodiment of the present invention.

FIG. 1 is a circuit diagram of a power supply unit according to the first embodiment of the present invention. The power supply unit 100 includes a series regulator 200 and a power consuming unit 300 that is provided on a path of DC current between a DC power supply 10 connected to the power supply unit 100 and an input side of the series regulator 200. The power supply unit 100 also includes a current setting unit 400 and a capacitor 110 for decoupling input DC voltage +B.

The series regulator 200 has an npn transistor 210, that serves a main regulator device, in which a collector serves as a current input and an emitter serves as a current output terminal, a Zener diode 212 that regulates an output DC voltage Vcc generated at the emitter of the npn transistor 210 and a capacitor 202 for decoupling connected to the emitter. A base of the npn transistor 210 is connected to a cathode terminal of the Zener diode 212, and a Zener voltage generated at this cathode terminal is input to the base. According to the above structure, the power supply unit 100 changes the input DC voltage +B input from the DC power supply 10 into the stabilized output DC voltage Vcc that is lower than the input DC voltage +B.

The power consuming unit 300 has a parallel circuit 310 in which an npn transistor 312 that is an exemplary semiconductor device of the present invention is connected in parallel to a resistor 314 that is an example of the first fixed resistor. The input side of the parallel circuit 310 is connected to the DC power supply 10, while the output side is connected to the collector of the npn transistor 210 of the series regulator 200.

The current setting unit 400 has a resistor serial circuit 410 in which two resistor devices 412 and 414 are connected to each other in series. One end of the resistor series circuit 410 is connected to the DC power supply 10. To this end, the input DC voltage +B input from the DC power supply 10 is applied. On the other hand, the other end of the resistor series circuit 410 is connected to the cathode terminal of the Zener diode 212 forming the series regulator 200. To this end, the Zener voltage generated at the cathode terminal of the Zener diode 212 is applied. A divided voltage generated at a setting output in the current setting unit 400 that is located between the two resistor devices 412 and 414 (at a connection point 413) is applied to the base of the npn transistor 312 forming the power consuming unit 300. Thus, the current setting unit 400 sets the amount of the current flowing from the collector of the npn transistor 312 to the emitter thereof by regulating a bias voltage (bias current) at the base of the npn transistor 312 that serves as the setting input.

For example, in a case where the input DC voltage +B input from the DC power supply 10 is 15 V, the output DC voltage Vcc of the series regulator is 5 V, the output current Icc of the series regulator 200 is 0.1 A, and the resistance value of the resistor 314 is 100 Ω, the current flowing through the npn transistor 312 is set by setting the divided voltage generated at the connection point 413 in the resistor series circuit 410 so as to make the potential on the output side of the power consuming unit 300 be 7 V. In this case, the power loss in the npn transistor 210 is (7 V−5 V)×0.1 A=0.2 W. Since the current flowing through the resistor 314 arranged in parallel to the npn transistor 312 is (15 V−7 V)/100 Ω=0.08 A, the power loss in the resistor 314 is (15 V−7 V)×0.08 A=0.64 W. The power loss in the npn transistor 312 is (15 V−7 V)×(0.1 A−0.08 A)=0.16 W. Thus, the power loss in the entire circuit is (+B−Vcc)×Icc=(15 V−5 V)×0.1 A=1 W. This is equal to the sum of the power losses in the power consuming unit 300 and the npn transistor 210.

As described above, since the power supply unit 100 of the first embodiment has the power consuming unit 300 provided on the DC path between the DC power supply 10 and the series regulator 200, the power loss in the entire circuit can be distributed into the series regulator 200 and the power consuming unit 300, so that concentration of the power loss can be prevented. Thus, heat generated by the npn transistor 210 that constitutes the series regulator 200 can be reduced. Moreover, since the power loss is not concentrated on the same portion, the design of the entire power supply unit for radiating the heat can be easier, thus improving the reliability of the power supply unit related to the heat generation. Especially, by providing the fixed resistor 314 between the DC power supply 10 and the series regulator 200, conversion of the voltage drop into heat can be performed by the fixed resistor that has larger heat capacity than semiconductor. Thus, excellent heat radiation effects can be achieved.

In addition, since the number of parts constituting the power consuming unit 300 and the current setting unit 400 is relatively small, the increase of the cost can be suppressed. Moreover, by distributing the heat, it is possible to select a small inexpensive semiconductor device for the series regulator. Therefore, the size reduction of the power supply unit can be realized.

Moreover, according to the structure of the power supply unit of the first embodiment, a circuit fitting to input/output specification, a transistor desired to be used, the resistor size related to heat radiation rating can be fabricated by changing the constant of the resistor 314 and the resistance ratio of the resistor devices 412 and 414 in the resistor series circuit 410. In addition, the output DC voltage Vcc cannot exceed the defined voltage irrespective of the input/output specification.

In order to enhance the heat radiation effect of the resistor 314 arranged in parallel to the transistor 312 of the power consuming unit 300, all or part of the circuit may be formed on a printed board, for example, of aluminum or ceramic like a thick-film hybrid IC, on which the resistor 314 is formed by printing.

Figure 2:
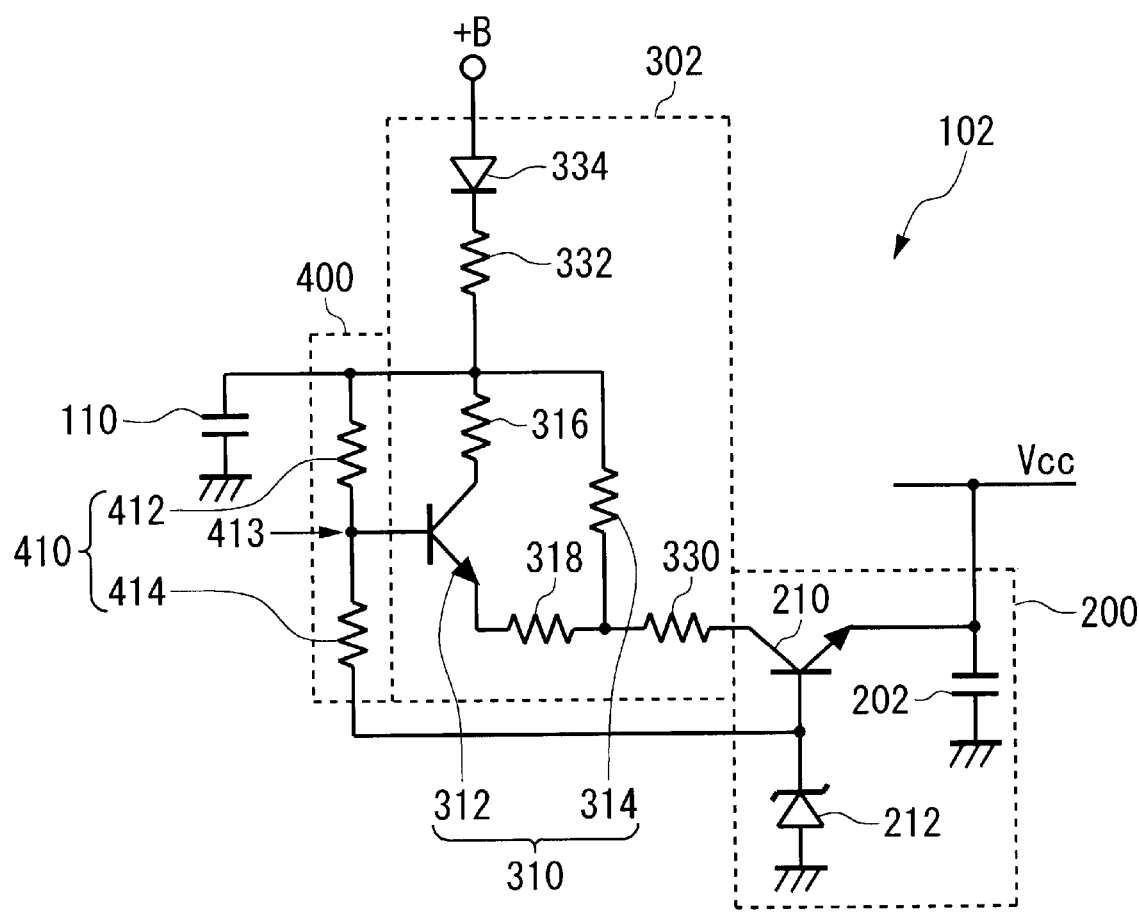
FIG. 2 is a circuit diagram of a power supply unit according to the second embodiment of the present invention.

FIG. 2 is a circuit diagram of the power supply unit according to the second embodiment of the present invention. The power supply unit 102 is different from that of the first embodiment in that the parallel circuit 310 of the power consuming unit 302 further includes a resistor 316 provided between the collector of the npn transistor 312 and the DC power supply 10, and another resistor 318 provided between the emitter of the npn transistor 312 and the collector of the npn transistor 210 that corresponds to the input of the series regulator 200. The power supply unit 102 of the second embodiment is also different from that of the first embodiment in that the power consuming unit 302 further includes a resistor 330 provided between the output of the parallel circuit 310 and the collector of the npn transistor 210 and a series circuit formed by a resistor 332 and a diode 334 provided between the input of the parallel circuit 310 and the DC power supply 10. The resistors 316 and 318 are exemplary third fixed resistors of the present invention, while the resistors 330 and 332 are exemplary fourth fixed resistors of the present invention. The diode 334 is not always necessary.

When the input DC voltage +B becomes large, the difference between the input and output voltages of the series regulator 200 also becomes large, so that the heat generated by the npn transistor 210 forming the series regulator 200 becomes large. In a case where Icc=0.1 A, +B=35 V and Vcc=5 V, for example, the power loss is (+B−Vcc)×Icc=(35 V−5 V)×0.1 A=3 W when the input DC voltage is input directly to the series regulator 200. Moreover, since the difference between the input and output voltages is large, a further resistor may be provided between the DC power supply 10 and the series regulator 200 in series.

When 200 Ω is inserted in the above example as composed series resistance during the operation, that is formed by the resistors 332 and 330 and the parallel circuit 310, the voltage drop by the composed series resistance is 20 V. However, the voltage 15 V still remains and therefore the operation of the series regulator can be ensured sufficiently. In addition, by forming the power consuming unit 300 as shown in FIG. 2, the power loss in the entire circuit can be distributed into the series regulator 200 and the power consuming unit 300, while the power loss in the power consuming unit 300 can be distributed not only into the resistor 314 and the npn transistor 312 but also the resistors 332, 316, 318 and 330. Therefore, the power supply unit 100 of the second embodiment is effective when the input DC voltage +B is larger, or when a transistor having low heat loss is to be used although the number of the parts of the circuit is increased.

By changing the resistance ratio of the resistor devices 412 and 414 of the resistor series circuit 410 or adjusting the resistance ratio of the other resistors 332, 316, 318 and 330, the circuit fitting to input/output specification, a transistor desired to be used, the resistor size related to heat radiation rating can be achieved.

Figure 3:
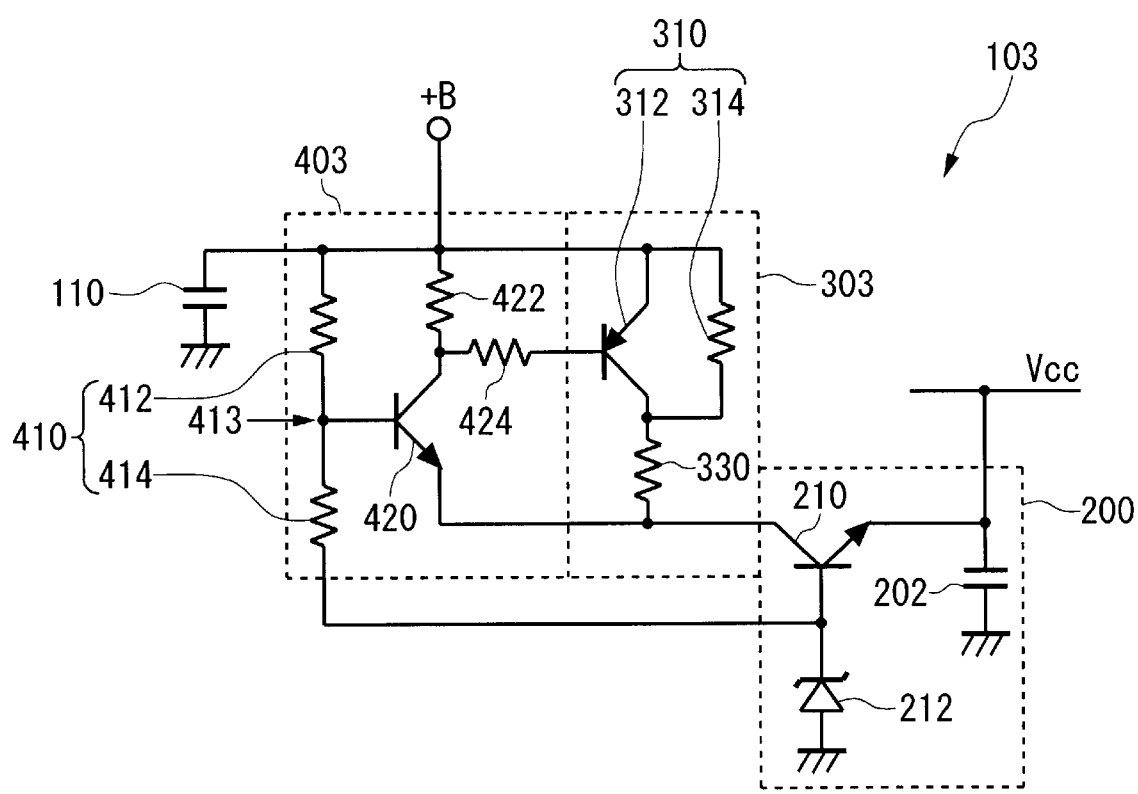
FIG. 3 is a circuit diagram of a power supply unit according to the third embodiment of the present invention.

FIG. 3 is a circuit diagram of the power supply unit according to the third embodiment of the present invention. The power supply unit 103 of the third embodiment is different in that of the first embodiment in the structure of the power consuming unit 303 and current setting unit 403. The power consuming unit 303 has the parallel circuit 310 in which a pnp transistor 312 as an example of the semiconductor device of the present invention, having an emitter serving as the current input, a collector serving as the current output and a base serving as the setting input, and the resistor 314 as an example of the first fixed resistor of the present invention are connected in parallel. The power consuming unit 303 also has the resistor 330 as an example of the fourth fixed resistor of the present invention, that is provided between the output side of the parallel circuit 310 and the collector of the npn transistor 210.

The current setting unit 403 includes the resistor series circuit 410 in which the two resistor devices 412 and 414 are connected in series with one end connected to the DC power supply 10 and the other end connected to the cathode terminal of the Zener diode 212; an npn transistor 420; and resistor devices 422 and 424. To the base of the npn transistor 420, a divided voltage generated at the setting output of the current setting unit 400, that is located between the two resistors 412 and 414 (connection point 413). The emitter of the npn transistor 420 is connected to the collector of the npn transistor 210 forming the series regulator 200. The collector of the npn transistor 420 is connected to the DC power supply 10 via the resistor device 422 as an example of the first resistor device of the present invention and to the base of the pnp transistor 312 via the resistor device 424 as an example of the second resistor device of the present invention.

The power supply unit 103 of the third embodiment can handle a case where the input DC voltage is larger than that in the first embodiment because the number of the transistors and resistors is increased as compared with the number of the parts in the first embodiment. Therefore, the power supply unit 100 of the third embodiment is effective in the case of larger input DC voltage +B, the case where the transistor having small heat loss is to be used although the number of the parts of the circuit is increased, and the like, as in the second embodiment.

By changing the resistance ratio of the resistor devices 412 and 414 of the resistor series circuit 410 and adjusting the resistance ratio of the resistor 314 arranged in parallel to the pnp transistor 312 to the resistor 330 connected to the parallel circuit 310 in series, the circuit fitting to input/output specification, a transistor desired to be used, the resistor size related to heat radiation rating can be achieved. In the structure of the third embodiment, the resistors 314 and 330 are especially effective in heat distribution.

Figure 4:
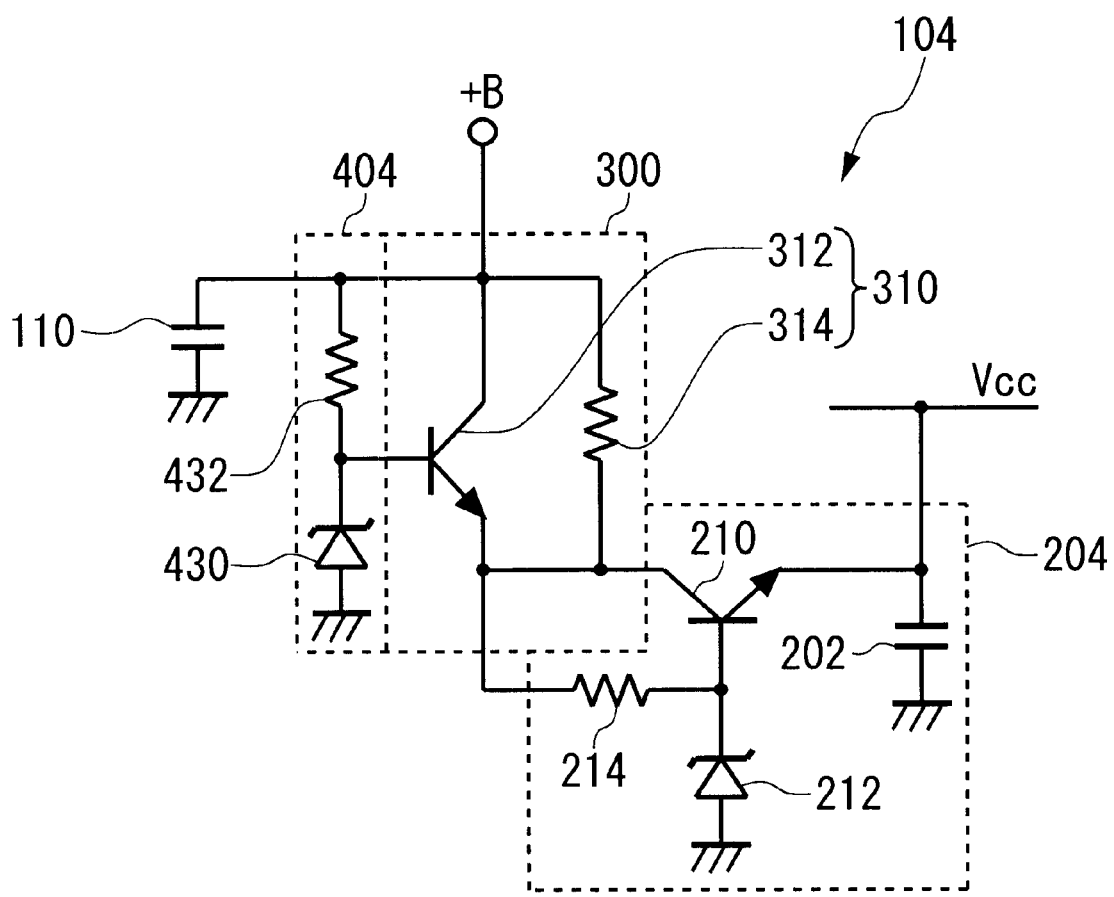
FIG. 4 is a circuit diagram of a power supply unit according to the fourth embodiment of the present invention.

FIG. 4 is a circuit diagram of the power supply unit according to the fourth embodiment of the present invention. The power supply unit 104 of the fourth embodiment is different from that in the first embodiment in that the series regulator 204 has a Zener resistor 214 connected between the cathode terminal of the Zener diode 212 that regulates the output DC voltage Vcc and the collector of the npn transistor 210 that is the input of the series regulator 204. The current setting unit 404 is also different from that in the first embodiment in that a Zener diode 430 and a Zener resistor 432 connected between the cathode terminal of the Zener diode 430 and the DC power supply are provided and the cathode terminal of the Zener diode serving as the setting output of the current setting unit 404 is connected to the base of the npn transistor 312 forming the power consuming unit 300. In the present embodiment, the more accurate Zener voltage generated at the cathode terminal of the Zener diode 430 is applied to the base of the npn transistor 312. Thus, the amount of the current flowing through the npn transistor 312 can be set more accurately.

Figure 5:
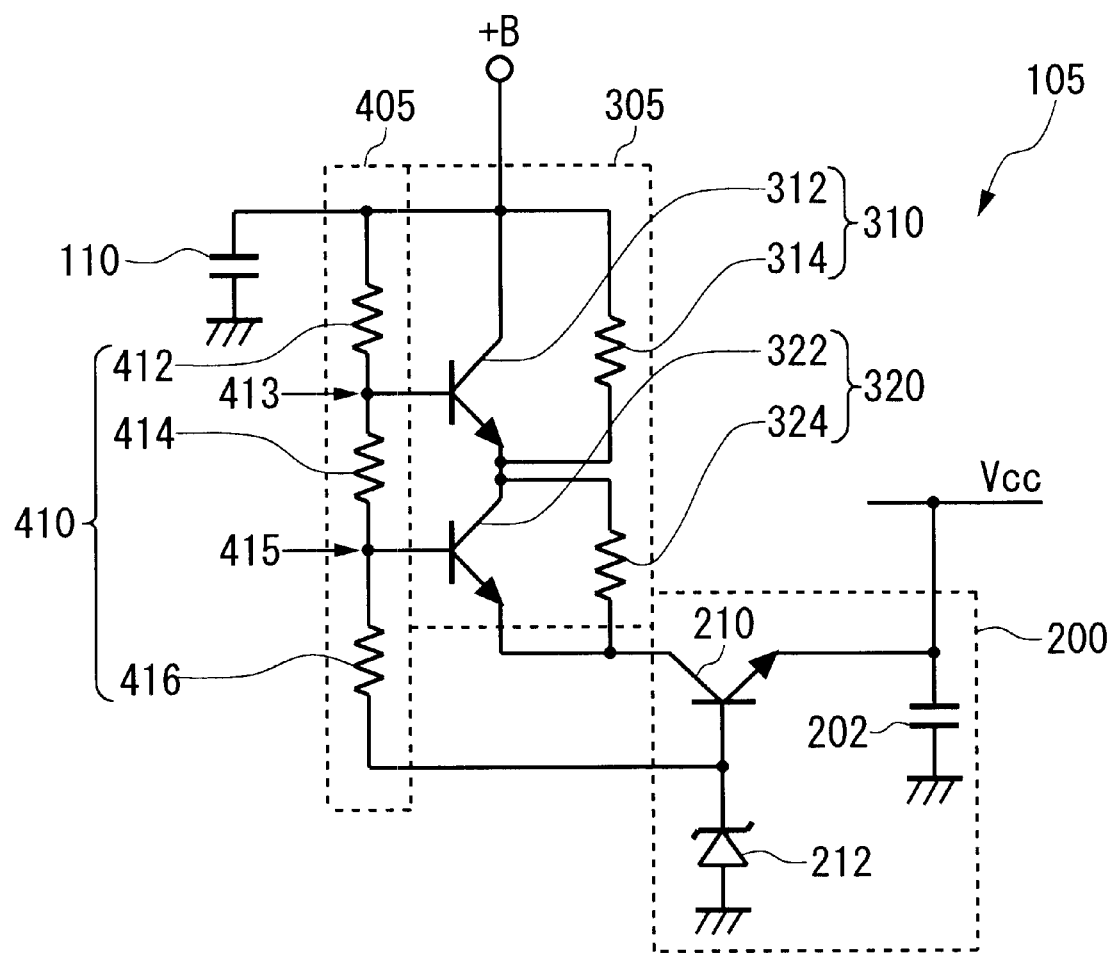
FIG. 5 is a circuit diagram of a power supply unit according to the fifth embodiment of the present invention.

FIG. 5 is a circuit diagram of the power supply unit according to the fifth embodiment of the present invention. The power supply unit 105 of the fifth embodiment is different from that of the first embodiment in that the power consuming unit 305 has parallel circuits 310 and 320 connected to each other in series and the number of the resistor devices constituting the resistor series circuit 410 included in the current setting unit 405 is increased so as to correspond to the number of the parallel circuits connected to each other.

In the power consuming unit 305, two parallel circuits are connected to each other in series. One of the parallel circuits, the circuit 310, is formed by the npn transistor 312 as an example of the semiconductor device of the present invention, having the collector serving as the current input, the emitter serving as the current output and the base serving as the setting input, and the resistor 314 as an example of the first fixed resistor of the present invention, the npn transistor 312 and the resistor 314 being connected in parallel. Similarly, the other parallel circuit 320 is formed by an npn transistor 322 and a resistor 324 connected in parallel.

The current setting unit 405 has the resistor series circuit 410 in which resistor devices 412, 414 and 416 are connected in series, the number of the resistor devices corresponding to the number of the parallel circuits connected to each other. One end of the resistor series circuit 410 is connected to the DC power supply 10, while the other end is connected to the cathode terminal of the Zener diode 212. The connection point 413 at which the resistor devices 412 and 414 are connected is connected to the base of the npn transistor 312. The other connection point 415 at which the resistor devices 414 and 416 are connected to each other is connected to the base of the npn transistor 322. In the above structure, divided voltages respectively generated at the connection points 413 and 415 as the setting outputs of the current setting unit 405, that are different from each other, are respectively applied to the bases of the transistors 312 and 322 in the associated parallel circuits in accordance with the order in which the transistors 312 and 322 are arranged.

According to the power supply unit 105 of the fifth embodiment, the heat generated can be distributed more effectively since a plurality of parallel circuits connected in series form the power consuming unit 305. The manner of the heat distribution can be adjusted by changing the resistance ratio of the resistor devices forming the resistor series circuit 410 so as to set the amount of the current flowing through the respective transistor.

Figure 6:
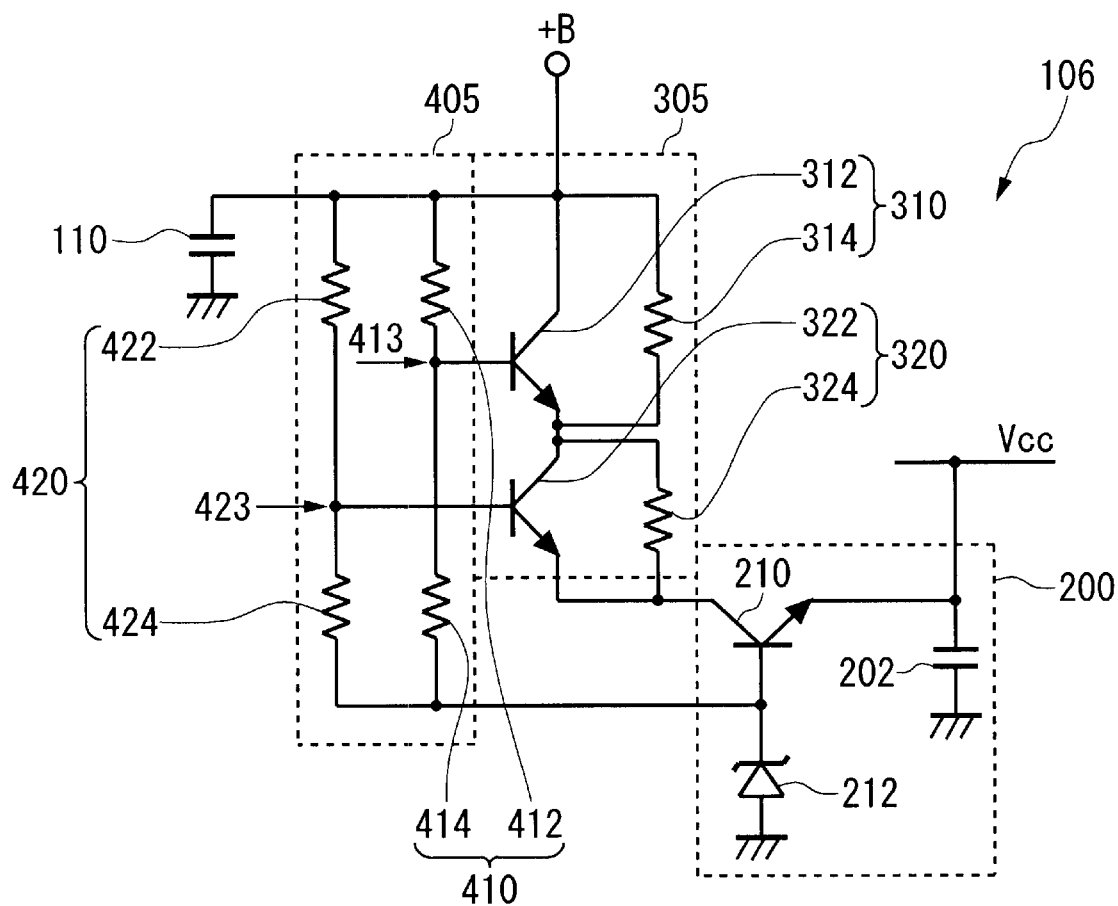
FIG. 6 is a circuit diagram of a power supply unit according to the sixth embodiment of the present invention.

FIG. 6 is a circuit diagram of the power supply unit according to the sixth embodiment of the present invention. The power supply unit 106 is different from that of the fifth embodiment in the structure of the resistor series circuit 410 of the current setting unit 406. The current setting unit 406 has the resistor series circuit 410 in which two resistor devices 412 and 414 are connected in series and the other resistor series circuit 420 formed by two resistor devices 422 and 424 connected in series. The number of the resistor series circuits is the same as the number of the parallel circuits included in the power consuming unit 305, which is two in the present embodiment.

One end of the resistor series circuit 410 is connected to the DC power supply 10 while the other end is connected to the cathode terminal of the Zener diode 212. Similarly, one end of the resistor series circuit 420 is connected to the DC power supply 10 while the other end is connected to the cathode terminal of the Zener diode 212.

The connection point 413 between the resistor devices 412 and 414 is connected to the base of the npn transistor 312, while the connection point 423 between the resistor devices 422 and 424 is connected to the base of the npn transistor 322. In the above structure, the divided voltage generated at the connection point 413 as one setting output of the current setting unit 406 is applied to the base of the transistor 312 as the associated setting input. Similarly, the divided voltage generated at the connection point 423 as the other setting output is applied to the base of the transistor 322 as the associated setting input.

According to the power supply unit 106 of the sixth embodiment, the heat can be distributed more effectively since a plurality of parallel circuits connected in series form the power consuming unit 305 as in the fifth embodiment. The manner of the heat distribution can be adjusted by changing the resistance ratios of the resistor devices forming the resistor series circuits 410 and 420 to set the amount of the current flowing through the respective transistor of the power consuming unit 305.

Figure 7:
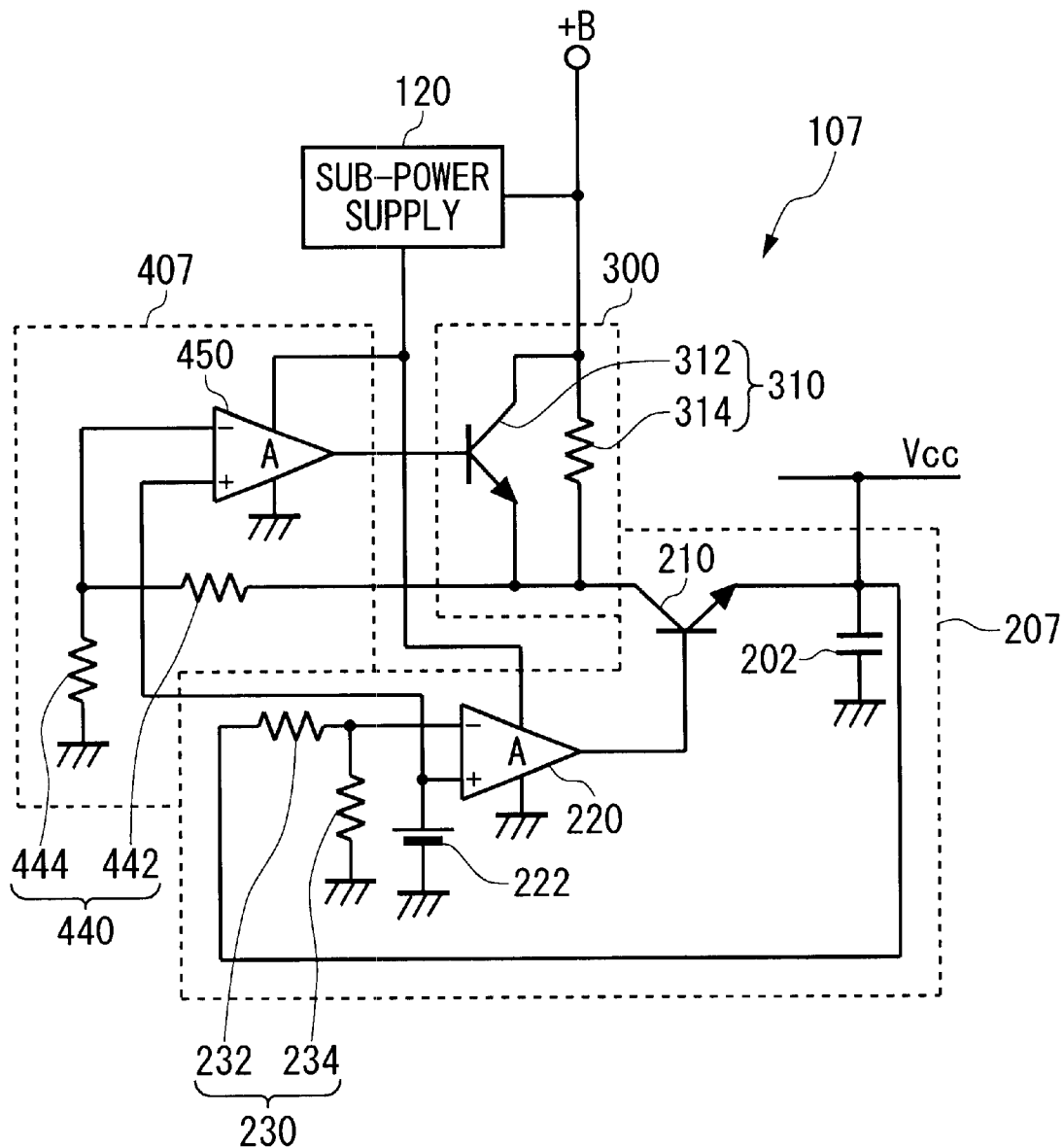
FIG. 7 is a circuit diagram of a power supply unit according to the seventh embodiment of the present invention.

FIG. 7 is a circuit diagram of the power supply unit according to the seventh embodiment of the present invention. The power supply unit 107 of the seventh embodiment is different from that of the first embodiment in that a part of the series regulator 207 for setting a reference voltage and the power consuming unit 407 include amplifying circuits, respectively. The series regulator 207 includes the npn transistor 210, an operational amplifier 220 as an example of an inverting amplifier, a feedback circuit 230 having two voltage-dividing resistors 232 and 234, and a reference supply 222 that regulates the output DC voltage Vcc of the series regulator 207. The output DC voltage Vcc of the series regulator 207 is applied to the voltage-dividing resistor 232. The voltage at the connection point where the two voltage-dividing resistors 232 and 234 are connected is applied to an inverting input (−) of the operational amplifier 220. The reference voltage from the reference supply 222 (for example, about 2.5 V) is applied to a non-inverting input (+) of the operational amplifier 220.

The current setting unit 407 includes a feedback circuit 440 having two voltage-dividing resistors 442 and 444, that is connected to the emitter of the npn transistor 312, and an operational amplifier 450 having an inverting input (−) connected to the connection point where the two voltage-dividing resistors 442 and 444 are connected and a non-inverting input (+) to which the reference voltage is input from the reference supply 222, that is an example of the inverting amplifying circuit of the present invention. An output of the operational amplifier 450 serving as the setting output of the current setting unit 400 is connected to the base of the npn transistor 312.

To power terminals (positive terminals) of the operational amplifiers 220 and 450, a predetermined DC voltage is input from a sub-power supply 120.

In the power supply unit 107 of the seventh embodiment, the setting of the reference voltage for the series regulator 207 and the setting of the current flowing through the npn transistor 312, that is performed by the current setting unit 407, are controlled by the operational amplifiers and the feedback circuits. The operation of distributing the generated heat is, however, the same as the operation in the first embodiment, and therefore the power supply unit 107 of the seventh embodiment has the same effects as that of the first embodiment.

Figure 8:
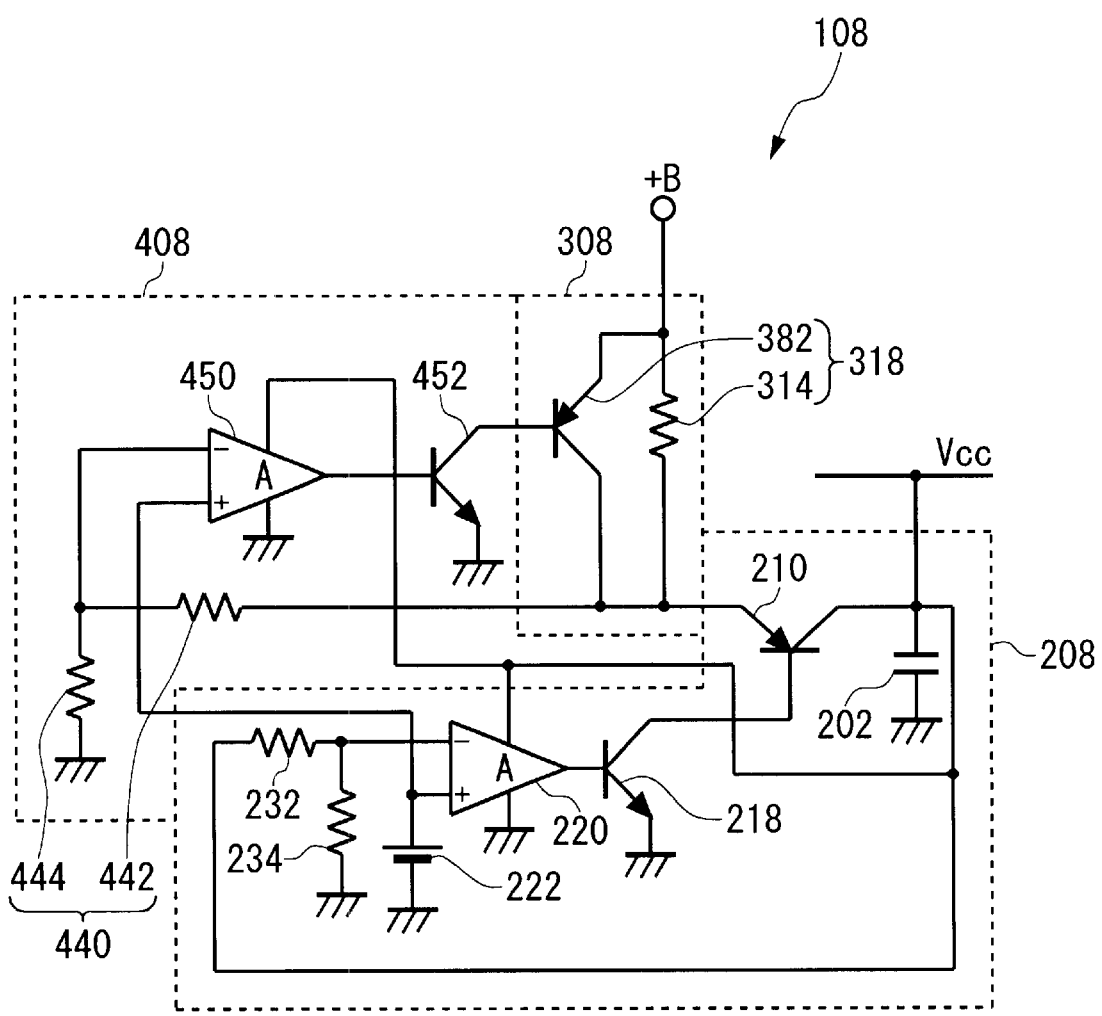
FIG. 8 is a circuit diagram of a power supply unit according to the eighth embodiment of the present invention.

FIG. 8 is a circuit diagram of the power supply unit according to the eighth embodiment of the present invention. The power supply unit 108 is different from that of the seventh embodiment in that the power consuming unit 308 includes a parallel circuit 310 having a pnp transistor 382 and a part of the current setting unit 408 for controlling the base of the pnp transistor 382 is modified. The power consuming unit 308 has the parallel circuit 318 in which the pnp transistor 382 as an example of the semiconductor device of the present invention and the resistor 314 as an example of the first fixed resistor of the present invention are connected in parallel. The emitter, collector and base of the transistor 312 serve as the current input, the current output and the setting input, respectively.

The current setting unit 408 includes the feedback circuit 440 having the two voltage-dividing resistors 442 and 444, that is connected to the collector of the pnp transistor 382, the operational amplifier 450 as an example of the inverting amplifying circuit of the present invention, and an npn transistor 452 in which the base is connected to the output of the operational amplifier 450 while the emitter is connected to a predetermined reference voltage (the emitter is grounded in the present embodiment). The inverting input (−) of the operational amplifier 450 is connected to the connection point of the voltage-dividing resistors 442 and 444. To the non-inverting input (+) of the operational amplifier 450, the reference voltage is input from the reference supply 222. Moreover, the collector of the npn transistor 452, that serves as the setting output of the current setting unit 408, is connected to the base of the pnp transistor 382.

To the power terminals (positive side) of the operational amplifiers 220 and 450, the output DC voltage Vcc is input from the npn transistor 210.

Figure 9A:
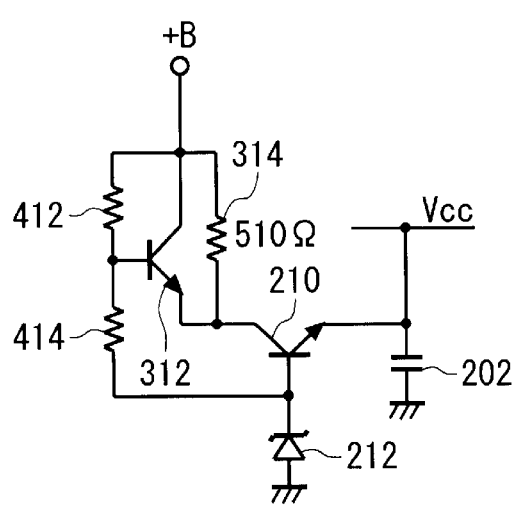
FIGS. 9A, 9B, 9C and 9D explain an example of heat distribution by a series regulator and a power consuming unit (in a case of rated specification of 24 V).
Figure 9B:
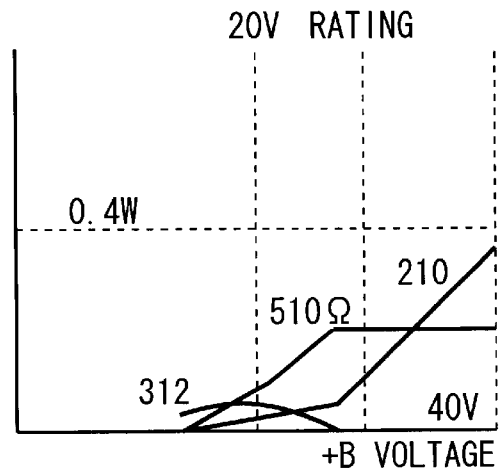
Figure 9C:
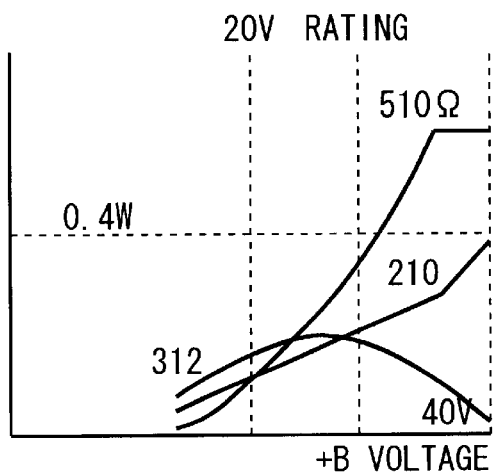
Figure 9D:
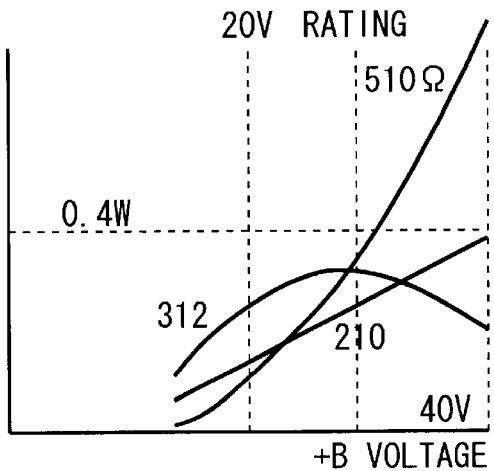

FIGS. 9A to 9D explain an example of the heat distribution by the series regulator 200 and the power consuming unit 300 in a case of rated specification of 24 V. FIG. 9A is a circuit diagram that is the same as that described in the first embodiment. FIGS. 9B, 9C and 9D are graphs showing the relationship between the power consumption and the +B voltage in cases of Icc=20 mA, Icc=35 mA, Icc=50 mA, respectively.

According to the power supply unit 100 of the respective embodiment described above, a circuit fitting to input/output specification, a transistor desired to be used, the resistor size related to heat radiation rating can be fabricated by changing the constant of the resistor 314 and the amount of the current flowing through the transistor 312. When such changes are to be made, however, it is necessary to take the rating of the device into consideration.

In a case of the rated specification of 24 V, for example, it is assumed that the maximum input DC voltage+Bmax is 40 V; the output rated current Icc is 35 mA; and the variation range of the output rated current is 20 mA to 50 mA (these are referred to as operating conditions). The power consumption of the transistor is set to 0.4 W or less, for example, so as to be below the rating of the respective device used in all the operating conditions. It should be noted that this power consumption is not the maximum power consumption of the transistor that is acceptable but the value considering the temperature derating of the power consumption.

The current setting unit 400 sets the amount of the current flowing through the npn transistor 312 so that the generated heat amount of the npn transistor 312 during the actual operation is approximately equal to the generated heat amount of the npn transistor 210 forming the series regulator 200. More specifically, the current setting unit 400 makes the power consumption (power loss) of the two npn transistors 312 and 210 approximately equal to each other under the rated condition in the case of the rated specification of 24 V, (Icc=35 mA when +B is 24 V). This is referred to as a fundamental condition. Moreover, in the exemplary circuit shown in FIG. 9A, the power consumption of the resistor 314 arranged in parallel to the npn transistor 312 is set to be equal to the power consumption to be assigned to the resistor 314 while the above fundamental condition is satisfied. For example, under the rated condition, the power loss to be assigned to the resistor 314 is made approximately equal to the power consumption of the npn transistors 312 and 210. More specifically, when the resistance value of the resistor 314 is set to 510 Ω, the relationships shown in FIGS. 9B, 9C and 9D are obtained under the above operating conditions.

Figure 10A:
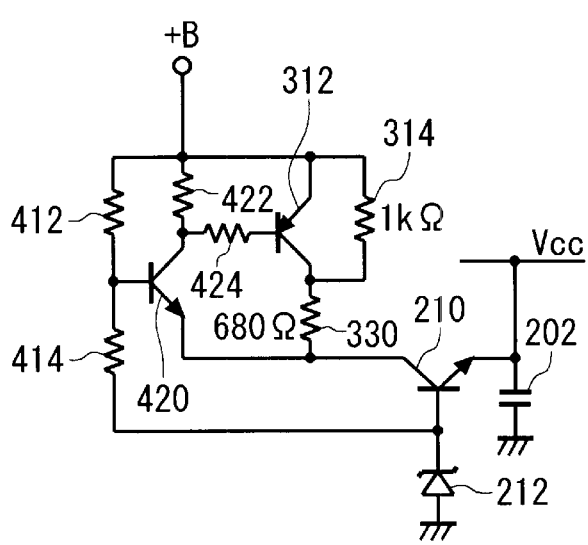
FIGS. 10A, 10B, 10C and 10D explain another example of the heat distribution by the series regulator and the power consuming unit (in a case of rated specification of 42 V).
Figure 10B:
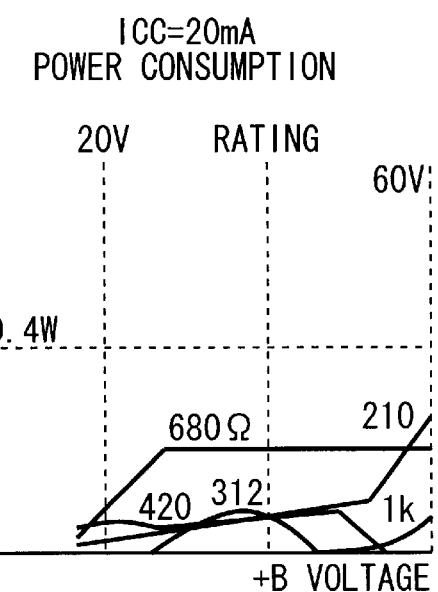
Figure 10C:
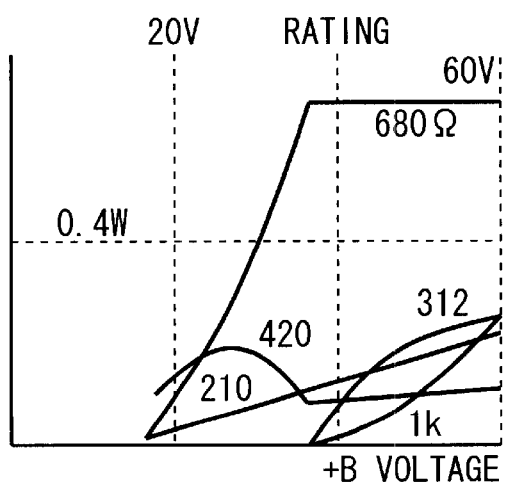
Figure 10D:
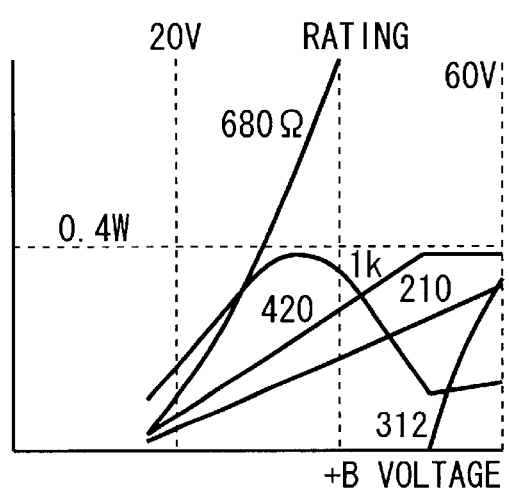

FIGS. 10A to 10D explain an example of the heat distribution by the series regulator 200 and the power consuming unit 300 in a case of rated specification of 42 V. FIG. 10A is a circuit diagram that is the same as that described in the third embodiment. FIGS. 10B, 10C and 10D are graphs showing the relationship between the power consumption and the +B voltage in cases of Icc=20 mA, Icc=35 mA, Icc=50 mA, respectively.

In a case of rated specification of 42 V, for example, it is assumed that the maximum input DC voltage+Bmax is 60 V; the output rated current Icc is 30 mA; and the variation range of the output rated current is 20 mA to 50 mA. The power consumption of the transistor is set to 0.4 W or less, for example, so as to be below the rating of the respective device used in all the operating conditions, as in the example shown in FIGS. 9A to 9D.

The current setting unit 400 sets the amount of the current flowing through the pnp transistor 312 so that the generated heat amount of the pnp transistor 312 during the actual operation is approximately equal to the generated heat amount of the npn transistor 210 forming the series regulator 200. More specifically, the current setting unit 400 makes the power consumption of the two transistors 312 and 210 approximately equal to each other under the rated condition in the case of rated specification of 42 V, (Icc=35 mA when +B is 42 V).

Moreover, in the exemplary circuit shown in FIG. 10A, the power consumption of the resistor 314, arranged in parallel to the pnp transistor 312, and the resistor 330 connected to the parallel circuit 310 in series is set to be equal to the power consumption to be assigned to the resistor 314 while the above fundamental condition is satisfied. More specifically, when the resistance values of the resistors 314 and 330 are set to 1 kΩ and 680 Ω, respectively, the relationships shown in FIGS. 10B, 10C and 10D are obtained under the above operating conditions.

Figure 11A:
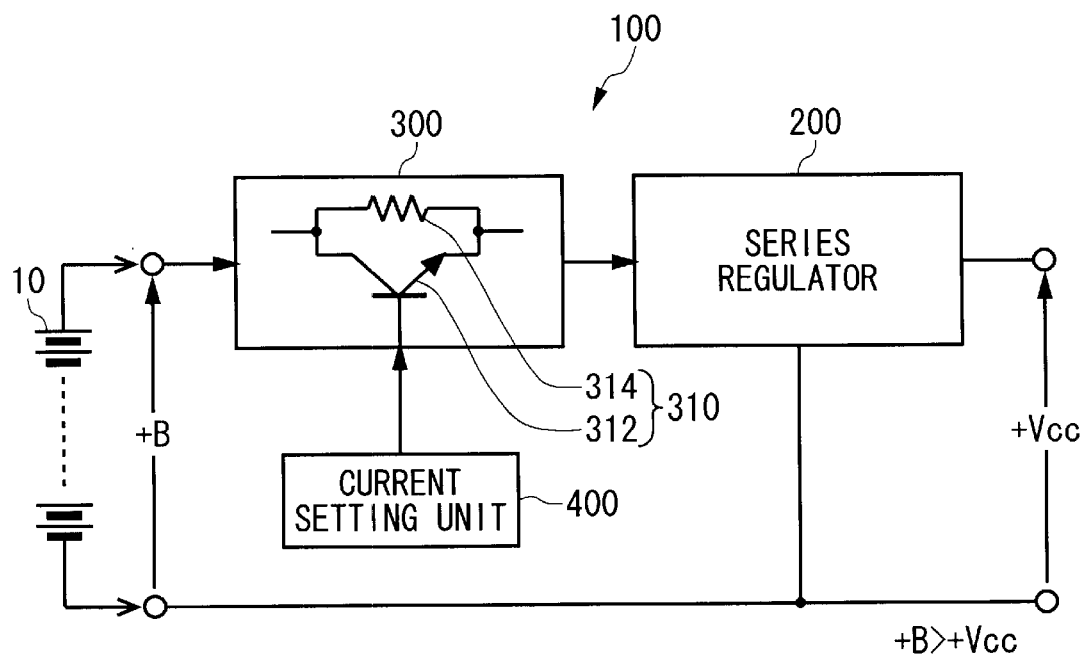
FIGS. 11A and 11B are block diagrams showing another example of the structure of the power supply unit of the present invention.
Figure 11B:
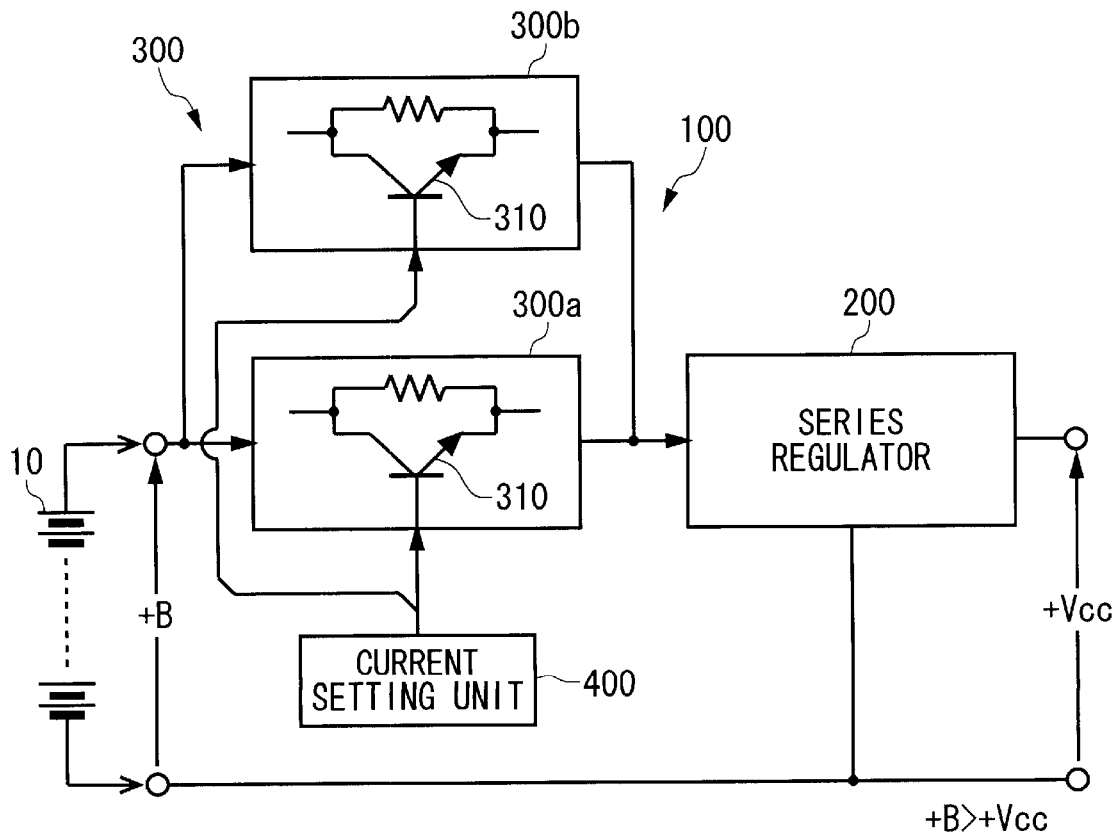

FIGS. 11A and 11B are block diagrams for explaining another exemplary structure of the power supply unit of the present invention. FIG. 11A shows the general representation of the power supply unit 100 to 108 of the respective embodiments described above. For explanation, the power supply unit 100 of the first embodiment is described as an example. However, the other supply unit 102 to 108 of the second to eighth embodiment may also be used thereto. The power supply unit 100 includes a power consuming unit 300, provided on a path of DC current between a DC power supply 10 and an input end of a series regulator 200, that is formed by a transistor 312 as the semiconductor device of the present invention and a fixed resistor 314; and a current setting unit 400 that sets the amount of current flowing between a current input and a current output of the transistor 312. The transistor 312 is arranged in such a manner that the collector, serving as the current input, is arranged on the DC-power-supply side; the emitter serving as the current output is arranged on the series—regulator side; and the base serving as a setting input of the transistor is connected to a setting output of the current setting unit 400.

On the other hand, FIG. 11B generally illustrates another embodiment of the power supply unit. This power supply unit 100 is different from that shown in FIG. 11A in that two power consuming units 300a and 300b (that is, two parallel circuits 310) are connected in parallel. The current setting unit 400 may be provided for each of the power consuming units 300a and 300b, although a single current setting unit 400 is provided for the power consuming units 300a and 300b in the example shown in FIG. 11B.

Figure 12A:
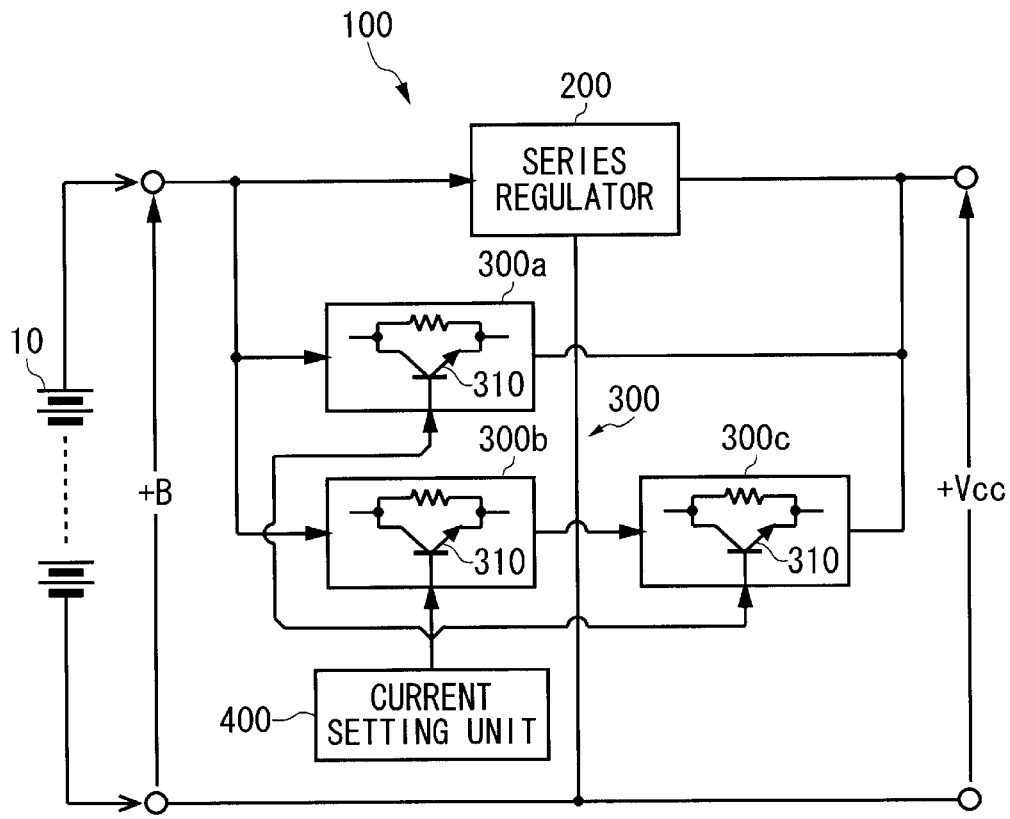
FIGS. 12A and 12B are block diagrams showing other examples of the structure of the power supply unit of the present invention.
Figure 12B:
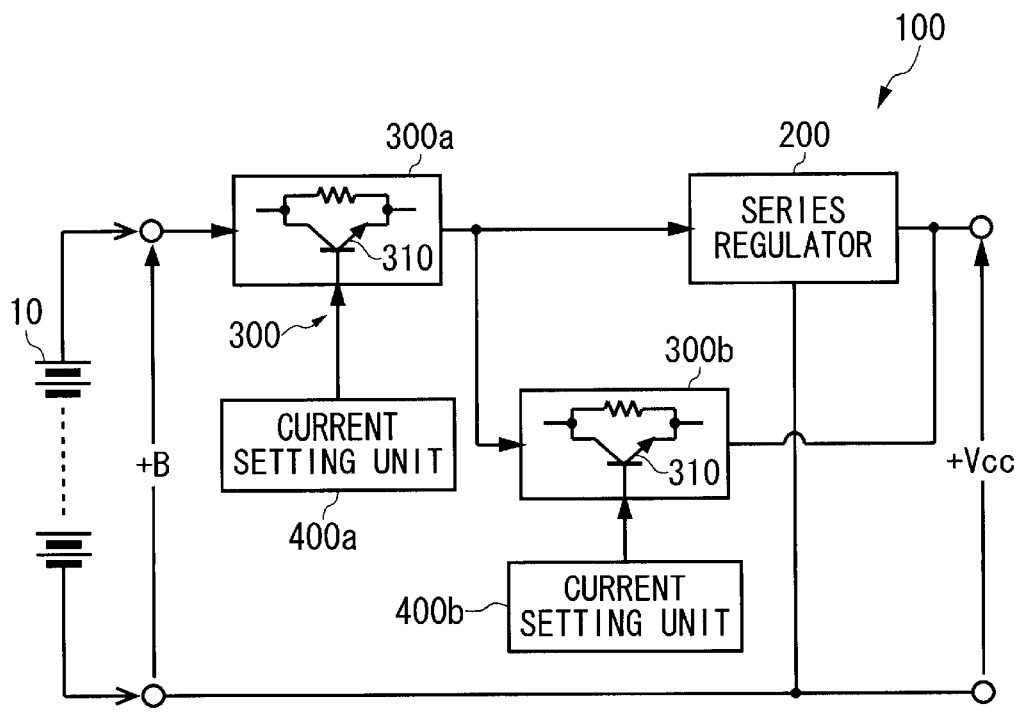

FIGS. 12A and 12B are block diagrams showing still another embodiment of the power supply unit of the present invention. The power supply unit 100 shown in FIG. 12A is different from that shown in FIG. 11A in that the power supply unit 100 includes a power consuming unit 300a having a parallel circuit 310, provided in parallel to the series regulator 200, that is formed by a fixed resistor and a transistor as an example of the semiconductor device of the present invention, and two power consuming units 300b and 300c (that is, two parallel circuits 310) are connected in series and are arranged in parallel to the series regulator 200. The current setting unit 400 may be provided for each of the power consuming units 300a, 300b and 300c, although a single current setting unit 400 is provided.

The power supply unit 100 shown in FIG. 12B includes: a power consuming unit 300a having a parallel circuit 310, provided on the direct current path between the DC power supply 10 and the input side of the series regulator 200, that is formed by a fixed resistor and a transistor as an example of the semiconductor device of the present invention; and another power consuming unit 300b, provided in parallel to the series regulator 200, that is formed by a fixed resistor and a transistor as the semiconductor device of the present invention. Therefore, the structure shown in FIG. 12B corresponds to a combination of those shown in FIGS. 11A and 12A. In this example, a current setting unit 400a or 400b is provided for each of the power consuming units 300a and 300b.

Figure 13:
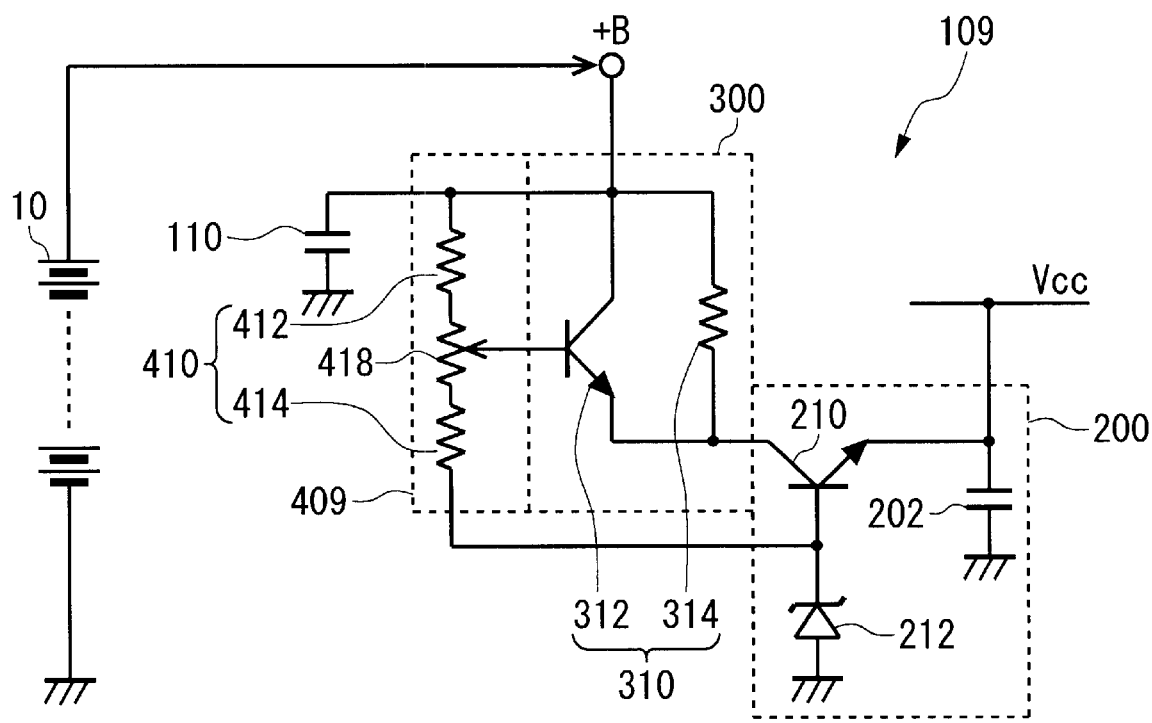
FIG. 13 is a block diagram showing still another example of the structure of the power supply unit of the present invention.

FIG. 13 is a circuit diagram showing still another example of the structure of the power supply unit of the present invention. The power supply unit 109 is different from that of the first embodiment in that a variable resistor 418 as an exemplary changing unit for changing the bias of the npn transistor 312 is provided between the two resistor devices 412 and 414 that form the resistor series circuit 410 of the current setting unit 409, the center tap of the variable resistor 418 being connected to the base of the npn transistor 312. By adjusting the variable resistor 418 in a rotating manner, the bias voltage of the npn transistor 312 is changed. In this way, even after the power supply unit 109 is fabricated, the setting can be made in accordance with input/output specification, a transistor desired to be used, the resistor size related to heat radiation rating by adjusting the variable resistor 418 of the resistor series circuit 410 in the rotating manner without changing the resistance ratio of the resistor devices 412 and 414 of the resistor series circuit 410.

Figure 14A:
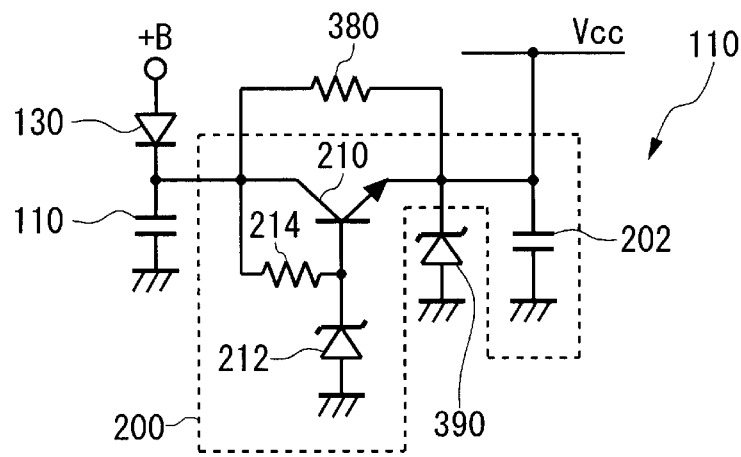
FIGS. 14A, 14B and 14C are block diagrams showing other examples of the structure of the power supply unit of the present invention.
Figure 14B:
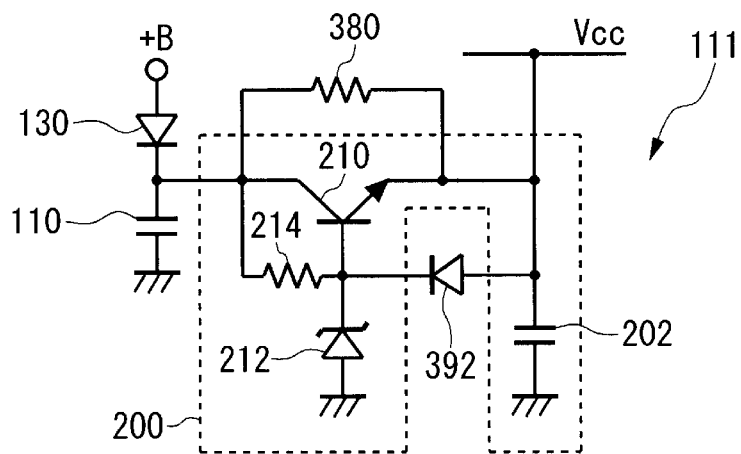
Figure 14C:
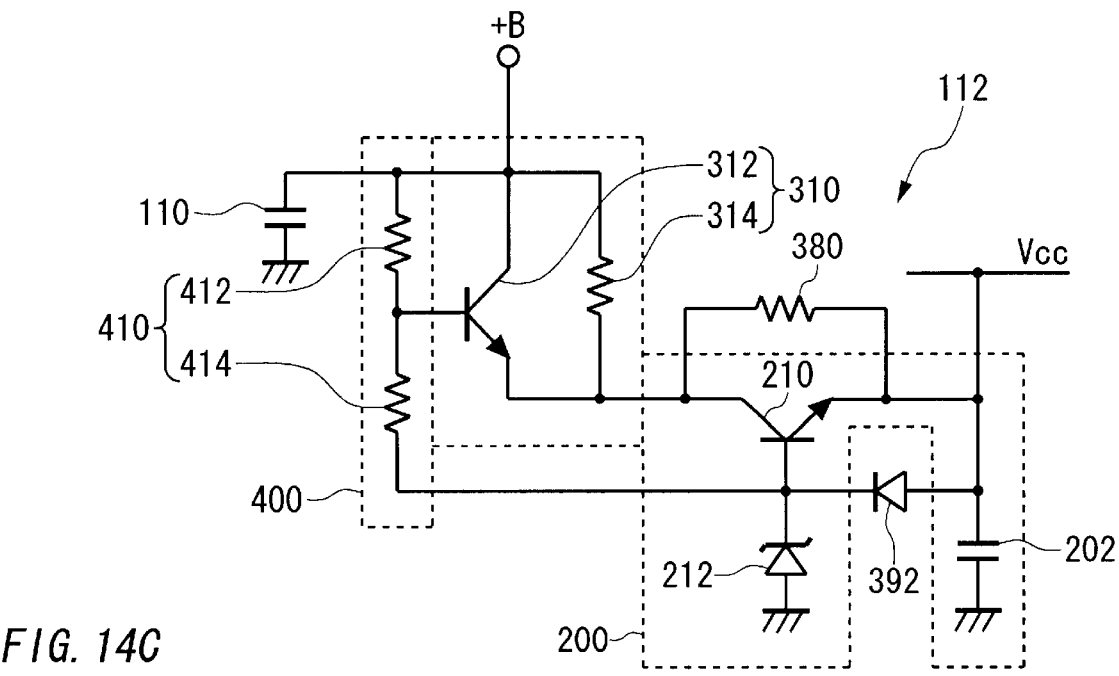

FIGS. 14A, 14B and 14C are circuit diagrams respectively showing other examples of the structure of the power supply unit of the present invention. In the power supply unit 110 shown in FIG. 14A, the series regulator 200 includes: an npn transistor 210 serving as a main regulator device, having a collector as the current input and an emitter as the current output terminal; a Zener diode 212 that regulates the output DC voltage Vcc generated at the emitter of the npn transistor 210 that is the output of the series regulator 200; and a Zener resistor 214 connected between the cathode terminal of the Zener diode 212 and the collector of the npn transistor 210 that is the input of the series regulator 200.

Moreover, the power supply unit 110 shown in FIG. 14A includes a resistor 380 as an example of the fifth fixed resistor of the present invention provided in parallel to the series regulator 200, and a clamp diode that clamps the output DC voltage of the series regulator 200 to be a predetermined voltage between the input DC voltage and the output DC voltage. That is, the power supply unit 100 has a single resistor arranged in parallel to the series regulator 200, instead of the parallel circuit 310 formed by the transistor and the resistor that distributes the power loss.

The clamp diode is a Zener diode 390 in which a cathode terminal is connected to the output of the series regulator 200 and an anode terminal is connected to the cathode terminal of the Zener diode 212 that regulates the reference voltage for the series regulator 200. Please note that a diode 130 connected between the series regulator 200 and the DC power supply 10 in FIG. 14A is not always necessary.

The power supply unit 111 shown in FIG. 14B is different from that shown in FIG. 14A in that the clamp diode is formed by the Zener diode 212 and a diode 392 having an anode terminal connected to the output of the series regulator 200 and a cathode terminal connected to the cathode terminal of the Zener diode 212.

The power supply unit 112 shown in FIG. 14C corresponds to combination of the power supply unit 100 shown in FIG. 1 and that shown in FIG. 14B. That is, in the power supply unit 112 shown in FIG. 14C, the series regulator 200 has the Zener diode 212 that regulates the output DC voltage of the series regulator 200. The detailed description of the power supply unit 112 shown in FIG. 14C is omitted.

In order to enhance the head radiation effect of the resistor 380 arranged in parallel to the transistor 210 forming the series regulator 200 in the respective power supply units shown in FIGS. 14A, 14B and 14C, all or part of the circuit may be formed on a printed board, for example, of aluminum or ceramic like a thick-film hybrid IC, on which the fixed resistors are formed by printing.

In the structures of the power supply unit 110 to 112 shown in FIGS. 14A, 14B and 14C, the power loss (generated heat) is distributed into the resistor 380 arranged in parallel to the series regulator 200, thus reducing the power loss (generated heat) in the semiconductor device (transistor in the above embodiments) used as the series regulator 200. Therefore, the power supply unit 110 to 112 can be formed by using small inexpensive semiconductor device. In addition, since the resistors are smaller and less expensive than the semiconductor devices, the power supply unit 110 to 112 that is smaller and less expensive than the power supply units in the above embodiments can be obtained. Moreover, when the resistor is formed by a chip resistor on the printed board, the generated heat is naturally radiated to the printed board, thus enhancing the heat distribution effect. In a case where the printed board is formed of aluminum or ceramic, the heat radiation effect is further improved. This allows the resistor to be selected while the necessity of considering the derating is reduced. Furthermore, in a case where the resistor is formed by printing, the effect obtained by using the smaller and less expensive semiconductor device can be enhanced.

For example, a case where Icc is 0.1 A, +B is 15 V, Vcc=5 V, and the resistance value of the resistor 380 is 250 Ω is considered. In this case, the power loss in the resistor 380 is $(15\ V-5\ V)^2/250\ \Omega=0.4\ W$ and the power loss in the npn transistor 210 is 1 W–0.4 W=0.6 W. These are generated because part of Icc is supplied via the resistor 380.

However, the following problems might arise when some input/output specifications are employed, if no modification other than the addition of the resistor 380 in parallel to the series regulator 200 is made in the power supply unit 110 to 112. The first problem arises in a case where Icc largely fluctuates in accordance with the power supply specification. In the above calculation, Icc is assumed to be 0.1 A. However, since the current flowing through the resistor 380 when the potential difference between both ends of the resistor 380 is 10 V is 0.04 A, Vcc cannot be 5 V while Icc becomes 0.02 A, for example. As a result, Vcc cannot be kept to be 5 V, but Vcc becomes 10V. This may cause break-down of the npn transistor 210 because the voltage applied thereto exceeds the breakdown voltage.

The second problem arises in a case where +B has transitional surge (about 100 V). For example, when the potential difference between both ends of the resistor 380 exceeds 25 V, the current of 0.1 A or more naturally flows from the resistor 380 to Vcc. As a result, Vcc cannot be kept to be 5 V, as in the first problem.

On the other hand, in the respective power supply units 110 to 112 shown in FIGS. 14A, 14B and 14C, the current flowing via the resistor 380 flows to the reference voltage via the clamp diode and therefore the output DC voltage is clamped to be a predetermined voltage. Thus, the breakdown of the npn transistor 210 because of the application of the voltage exceeding the breakdown voltage can be prevented. In the structure shown in FIG. 14A, the Zener voltage of the Zener diode 390 is the clamped voltage. In the structures shown in FIGS. 14B and 14C, the Zener voltage of the Zener diode 212 that regulates the output DC voltage of the series regulator 200 is the clamped voltage.

In the above description, examples where the npn or pnp transistor is used as the semiconductor device forming the parallel circuit of the power consuming unit are described. However, other semiconductor devices such as a field-effect transistor (FET), can be used. Moreover, the series regulator may be a three-terminal regulator forming an IC, instead of the transistor.

As described above, according to the power supply unit of the present invention, the power loss in the power supply unit is distributed to the fixed resistor(s) as well as to the series regulator. Thus, excellent heat radiation effect can be achieved, resulting in the excellent power supply unit that is advantageous in the size reduction.

Although the present invention has been described by way of exemplary embodiments, it should be understood that those skilled in the art might make many changes and substitutions without departing from the spirit and the scope of the present invention which is defined only by the appended claims.

What is claimed is:

1. A power supply unit having a series regulator that changes an input DC voltage input from a DC power supply into a stabilized output DC voltage lower than said input DC voltage, comprising:

a power consuming unit, provided on a direct current path between said DC power supply and an input side of said series regulator, including a parallel circuit formed by a first fixed resistor and a semiconductor device having a current input, a current output and a setting input; and a current setting unit operable to set an amount of a current flowing between said current input and said current output of said semiconductor device, wherein said current input of said semiconductor device is arranged on a DC power supply side thereof, said current output of said semiconductor device is arranged on a series-regulator side thereof, and said setting input of said semiconductor device is connected to a setting output of said current setting unit.

2. A power supply unit as claimed in claim 1, wherein said series regulator includes a Zener diode regulating an output voltage of said series regulator, said power consuming unit has a plurality of said parallel circuits in series, each formed by an npn transistor as said semiconductor device and said first fixed resistor connected in parallel, a collector, an emitter and a base of said npn transistor serving as said current input, said current output and said setting input of said semiconductor device, respectively, said current setting unit includes a resistor series circuit having resistors in series, a number of said resistor corresponding to that of said plurality of said parallel circuit, and one terminal thereof connecting to said DC power supply and the other terminal thereof connecting to a cathode of said Zener diode, and connection points of said plurality of resistors serve as said setting outputs, and divided voltages generated at said connection points are applied to said respective bases of said respective npn transistors in order of arrangement.

3. A power supply unit as claimed in claim 2, wherein each of said resistors of said current setting unit, having one terminal connected to said DC power supply and the other terminal of each of said resistors connecting to a cathode of said Zener diode.

4. A power supply unit as claimed in claim 1, wherein said current setting unit sets the amount of said current flowing through said semiconductor device by regulating a bias of said setting input of said semiconductor device.

5. A power supply unit as claimed in claim 4, wherein said current setting unit uses a voltage that regulates said output DC voltage of said series regulator as a reference voltage.

6. A power supply unit as claimed in claim 1, wherein said current setting unit sets the amount of said current flowing through said semiconductor device to make an amount of heat generated by said semiconductor device during an actual operation approximately equal to an amount of heat generated by said series regulator.

7. A power supply unit as claimed in claim 1, wherein said series regulator has a Zener diode that regulates said output DC voltage of said series regulator, said power consuming unit has said parallel circuit formed by an npn transistor as said semiconductor device and said first fixed resistor connected in parallel, a collector, an emitter and a base of said npn transistor serving as said current input, said current output and said setting input of said semiconductor device, respectively, said current setting unit includes a resistor series circuit formed by a plurality of resistor devices connected in series, one end of said resistor series circuit being connected to said DC power supply, the other end being connected to a cathode terminal of said Zener diode, and a divided voltage generated at said setting output of said current setting unit, that is positioned between said plurality of resistor devices, is applied to said base of said npn transistor.

8. A power supply unit as claimed in claim 1, wherein said power consuming unit has a plurality of said parallel circuits in parallel, each formed by a pnp transistor as said semiconductor device and said first fixed resistor connected in parallel, a collector, and emitter and a base of said pnp transistor serving as said current output, said current input and said setting input of said semiconductor device, respectively, said current setting unit includes a feedback circuit connecting to said emitter, and an inverting amplifying circuit having an inverting terminal connected to said feedback circuit, a non-inverting terminal receiving a predetermined voltage regulating an output direct voltage of said series regulator and an output connected to said base, and an npn transistor having a base connecting to said output of said inverting amplifying circuit and an emitter connecting predetermined reference voltage and a collector of said npn transistor serves as said setting output, and said output is connected to said base of said pnp transistor.

9. A power supply unit as claimed in claim 1, wherein said parallel circuit of said power consuming unit has a second fixed resistor connecting to said semiconductor device in series.

10. A power supply unit as claimed in claim 1, wherein said power consuming unit further includes a second fixed resistor connecting to said parallel circuit in series.

11. A power supply unit as claimed in claim 1, wherein said current setting unit includes:
   a feedback circuit connecting to said current output of said semiconductor device; and
   an amplifying circuit in which one terminal is connected to said feedback circuit while the other terminal is connected to said current input of said semiconductor device.

12. A power supply unit as claimed in claim 1, wherein said series regulator includes a Zener diode regulating an output voltage of said series regulator,
   said power consuming unit has said parallel circuit formed by an npn transistor as said semiconductor device and said first fixed resistor connected in parallel, a collector, an emitter and a base of said npn transistor serving as said current input, said current output and said setting input of said semiconductor device, respectively, and
   said current setting unit includes a resistor series circuit formed by a plurality of resistor devices connected in series, one end of said resistor series circuit being connected to said DC power supply, the other end being connected to a cathode terminal of said Zener diode, and an npn transistor having a base to which a divided voltage generated at said setting input between said resistor series is applied, an emitter connecting to said series regulator and a collector connect through a first fixed resistor to said DC power supply, and through a second fixed resistor to said base of said pnp transistor.

13. A power supply unit as claimed in claim 1, wherein said series regulator includes a first Zener diode regulating an output voltage of said series regulator, and a first Zener resistor connecting between a cathode of said first Zener diode and said series-regulator-input side,
   said power consuming unit has said parallel circuit formed by an npn transistor as said semiconductor device and said first fixed resistor connected in parallel, a collector, an emitter and a base of said npn transistor serving as said current input, said current output and said setting input of said semiconductor device, respectively,
   said current setting unit includes a second Zener diode, a second Zener resistor connecting between a cathode of said second Zener diode and said DC power supply, and
   said cathode of said second Zener diode serves as said setting output, and a Zener voltage generated at said cathode is applied to said base of said npn transistor.

14. A power supply unit as claimed in claim 1, wherein said power consuming unit has a plurality of said parallel circuits in parallel, each formed by an npn transistor as said semiconductor device and said first fixed resistor connected in parallel, a collector, an emitter and a base of said npn transistor serving as said current input, said current output and said setting input of said semiconductor device, respectively,
   said current setting unit includes a feedback circuit connecting to said emitter, and an inverting amplifying circuit having an inverting terminal connected to said feedback circuit and a non-inverting terminal receiving a predetermined voltage regulating an putout direct voltage of said series regulator, and
   an output of said inverting amplifying circuit serves as said setting output, and said output is connected to said base of said npn transistor.

15. A power supply unit having a series regulator that changes an input DC voltage input from a DC power supply into a stabilized output DC voltage lower than said input DC voltage, comprising:
   a first power consuming unit, provided in parallel to said series regulator, including a parallel circuit formed by a first fixed resistor and a first semiconductor device having a current input, a current output and a setting input; and
   a first current setting unit operable to set an amount of a current flowing between said current input and said current output of said first semiconductor device, wherein
      said current input of said first semiconductor device is arranged on a series-regulator-input side thereof, said current output of said first semiconductor device is arranged on a series-regulator-output side thereof, and said setting input of said first semiconductor device is connected to a setting output of said first current setting unit.

16. A power supply unit as claimed in claim 15, further comprising:
   a second power consuming unit, provided on a direct current path between said DC power supply and an input of said series regulator, having a parallel circuit formed by a second fixed resistor and a second semiconductor device; and
   a second current setting unit operable to set an amount of a current flowing between a current input and a current output of said second semiconductor device, wherein
      said current input of said second semiconductor device is arranged on a DC-power-supply side thereof, said current output of said second semiconductor device is arranged on a series-regulator side thereof, and a setting input of said second semiconductor device is connected to a setting output of said second current setting unit.

17. A power supply unit having a series regulator that changes an input DC voltage input from a DC power supply into a stabilized output DC voltage lower than said input DC voltage, comprising:
   a fixed resistor connected to said series regulator in parallel; and
   a clamp diode operable to clamp an output voltage to be a predetermined voltage between said input DC voltage and said output DC voltage.

18. A power supply unit as claimed in claim 17, wherein a cathode of said clamp diode is connected to an output of said series regulator, and an anode thereof is connected to a reference voltage of said series regulator.

19. A power supply unit as claimed in claim 17, said series regulator includes a Zener diode regulating an output DC voltage, and a resistor connected between a cathode of said Zener diode and an input of said series regulator, and
   said clamp diode includes a diode having an anode connected to an output of said series regulator and a cathode connected to said cathode of said Zener diode.

20. A power supply unit as claimed in claim 17, said series regulator includes a Zener diode regulating an output DC voltage, said power supply unit further comprises:
a power consuming unit including a parallel circuit in which an npn transistor and a first fixed resistor are connected in parallel, and
a current setting unit includes a resistor series circuit formed by a plurality of resistor devices connected in series, one end of said resistor series circuit being connected to said DC power supply, the other end being connected to a cathode terminal of said Zener diode, and
said power supply unit for regulating a current flowing between a collector and an emitter of said npn transistor, wherein a base of said transistor to which a divided voltage generated at said setting input between said resistor series is applied, said collector serves as an current input and said emitter serves as an current output, and
said clamp diode includes a diode having an anode connected to an output of said series regulator and a cathode connected to said cathode of said Zener diode, and said Zener diode.

* * * * *